Sept. 29, 1931.   G. C. MONCKMEIER   1,825,410
AUTOMATIC TAKE-UP BEARING
Filed Nov. 17, 1927
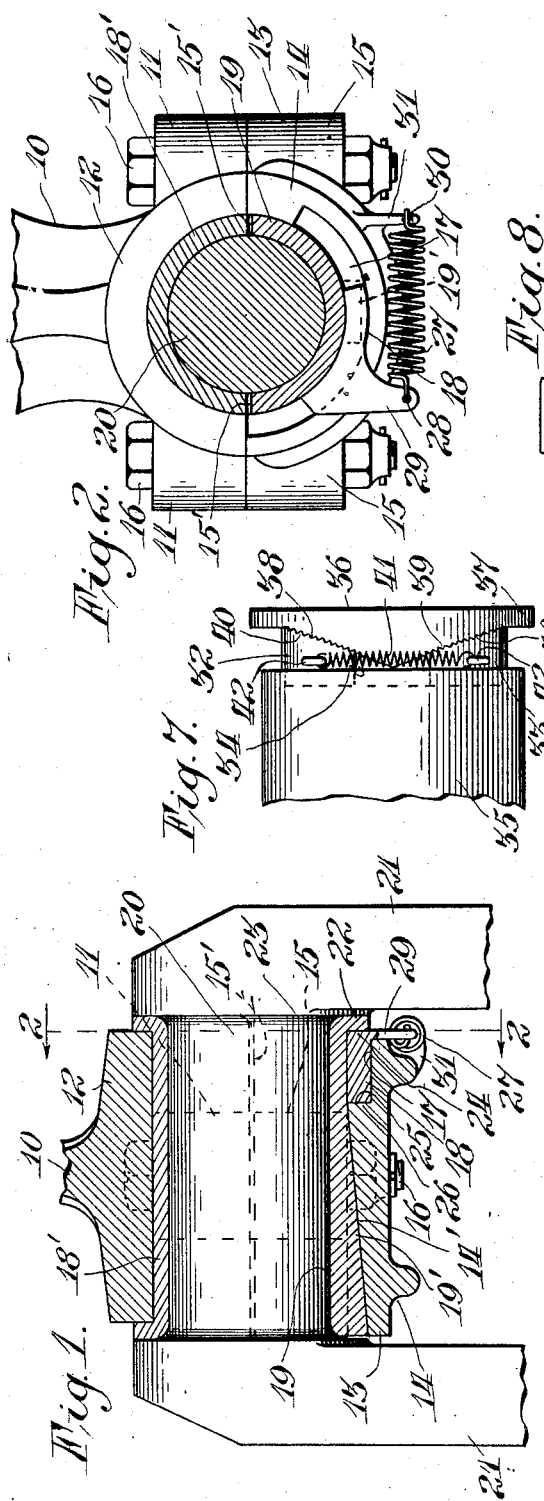
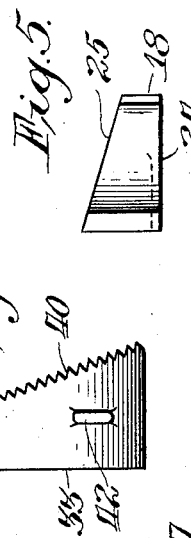
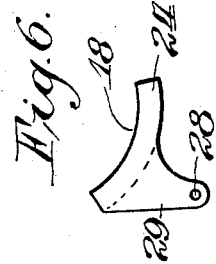
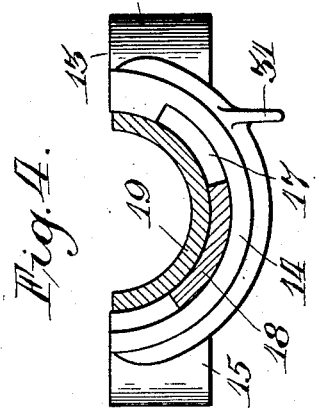
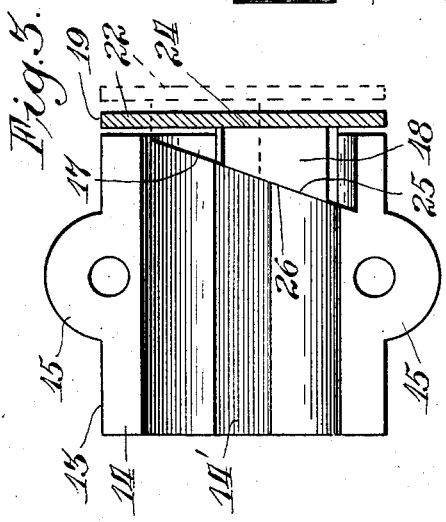
Inventor.
Gustav C. Monckmeier,
By John P. Smith
Atty.

Patented Sept. 29, 1931

1,825,410

UNITED STATES PATENT OFFICE

GUSTAV C. MONCKMEIER, OF TIPTON, IOWA

AUTOMATIC TAKE UP BEARING

Application filed November 17, 1927. Serial No. 233,760.

This invention relates to an automatic take-up bearing which is more particularly adapted as a combination thrust and radial bearing take-up on a main engine bearing for a crank shaft.

The invention is also adaptable with slight modification for automatically taking up the radial wear on a piston rod connection of a crank shaft by eliminating the thrust bearing feature of the combination.

This invention is particularly adapted for automobile engines of the Ford type in which the crank shaft is supported in bearings having lower removable bearing caps, but it will, of course, be understood that the same may be adapted for use for main crank shaft bearings of other types of automobile engines.

In the Ford type of automobile engine, a crank shaft at the rear end extends through a stationary circumferentially arranged series of electric pole members which are adapted to co-operate with a rotor or disc mounted on the crank shaft. This rotor or disc carries a series of peripherally arranged permanent magnets which must be held in relatively fixed rotary position with respect to the circumferentially arranged stationary electric pole members in order to efficiently maintain the proper spaced relation between the stationary member and the rotary member. It has been found by experience that the bearing cap or more particularly the soft metal bearing bushing in the course of time wears at either end, thus permitting the crank shaft to have too great a longitudinal play, which in turn, causes too great a space under certain conditions between the stationary electric pole members and the rotary disc, so as to render these parts inoperative. In addition to this thrust wear there is also a radial wear which causes a looseness in the main and piston rod connection bearings. Under these conditions, it is necessary to replace the worn parts which, in turn, involves the dismounting of the engine chassis or frame of the car in burdening the owner of the car with great expense both in the cost of time and the replacement of the worn parts.
It is, therefore, one of the objects of the present invention to provide a combination automatic thrust and radial take-up bearing which will compensate for not only the end wear but also the radial wear which ensues on the main bearing of the crank shaft and maintains a co-operative relation between the stationary electric pole members and rotor or discs so that these members will be held in their relative fixed positions in which they were originally placed in the engine.

A still further object of the invention is to provide an improved and novel form of an automatic combination thrust and radial take-up bearing in which a rotary wedge is mounted in the bearing cap and is placed under tension of a single spring for automatically moving a section of the soft metal lining longitudinally and radially with respect to the crank shaft bearing for taking up the wear as wear ensues thereon.

These and other objects are accomplished by providing a construction and an arrangement of the various parts in the manner hereinafter described and particularly pointed out in the appended claims.

Referring to the drawings, Fig. 1 is a longitudinal cross-sectional view of a main bearing of a motor showing a fragmentary portion of a crank shaft mounted therein and embodying my invention.

Fig. 2 is a cross-sectional view taken on the line 2—2, in Fig. 1.

Fig. 3 is a top plan view of the bearing cap showing the wedge mounted therein and also showing a full line cross-sectional view of the flange of the semi-circular bearing bushing and a dotted line position of the same.

Fig. 4 is an end elevational view of the bearing cap showing the semi-circular bearing bushing and rotary wedge mounted therein.

Figs. 5 and 6 are top plan and side elevational views respectively of the rotary wedge.

Fig. 7 is a bottom plan view of a modified form of double wedge member having a serrated edge on one beveled side thereof for actuating the semi-circular bearing bushing longitudinally of the bearing cap, and Fig. 8 is an enlarged top plan view of one of the wedges showing the modified form in Fig. 7.

The invention in the present instance is an improvement over the invention disclosed in my United States Letters Patent 1,646,416 patented October 25, 1927.

In carrying out my invention I have shown the same in connection with a main bearing support 10 of an engine or internal combustion motor. The main bearing 10 is provided with laterally extending apertured ears 11 which has formed therebetween, the usual semi-circular bearing portion 12.

My improved bearing cap 13 which is adapted to be substituted for the cap regularly furnished with the engine, comprises a semi-circular portion 14 and laterally extending apertured ear portions 15. These apertured ears, 15, of the bearing cap 13 are arranged to register with the apertured ears 11 of the main bearing 10 and are adapted to be secured thereto by means of bolts 16 of the usual construction. The bearing cap 13 is provided, adjacent one edge thereof, with a transverse beveled recess 17, in which is adapted to be rotatably or slidably mounted, a wedge member 18. Mounted between the semi-circular bearing portion 12 of the main bearing 10 and the semi-circular portion 14 of the bearing cap 13 are two semi-circular bearing bushings 18' and 19 within which is mounted the usual crank shaft 20. The crank shaft 20 is provided with the usual right angularly disposed crank arms 21. The lower semi-circular bearing bushing 19 has formed integrally therewith, and preferably on one edge thereof, an outwardly projecting annular flange 22 which is adapted to engage the annular edge 23 of the one of the crank arms 21 on one side thereof. The other side of the flange 22 of the semi-circular bearing bushing 19 is adapted to be engaged by the straight side 24 of the wedge member 18. While the beveled side 25 of the wedge member 18 is adapted to engage the beveled edge 26 of the recess 17 formed in the cap 13. The wedge member is normally actuated and automatically actuated for moving the semi-circular bearing bushing 19 longitudinally with respect to the bearing cap 13 by means of an extension spring 27 which has one end thereof hooked into an eye 28 formed on a downwardly projecting ear 29 which, in turn, is formed integrally with the wedge member 18. The other end of the spring 27 is hooked into an eye 30 formed in the downwardly projecting ear 31, which in turn, is formed integrally with the cap 13.

The lower semi-circular bearing bushing 19 is also actuated upwardly or radially with respect to the shaft by the action of the spring 27 and wedge member 17. This radial movement is accomplished by reason of an inclined rib or cam 19' which extends longitudinally of the semi-circular bushing 19 and is seated in a longitudinally extending inclined recess 14' formed in the bearing cap 14. The upper edges of semi-circular bushing 19 are cut off as shown at 15' making the same somewhat less than a true semi-circle so as to permit the semi-circular bushing 19 to move upwardly with respect to the shaft as the radial wear ensues on the bearing.

From the above description, it will be seen that as the thrust and radial wear ensues on the main bearing of the crank shaft and particularly on the semi-circular surface and flange 22 of the semi-circular bearing bushing 19 that the action of the spring automatically rotates the wedge member and thereby moves a semi-circular bearing bushing both radially and longitudinally for automatically taking up the wear as wear ensues.

In the modified form of my invention shown in Figs. 7 and 8, I have provided two oppositely disposed wedge members 32 and 33 which are adapted to be mounted in a transverse recess 34 formed in the semi-circular bearing cap 35. The semi-circular bearing bushing 36 is provided with a semi-circular flange 37 which is adapted to engage the flange 23 of the crank shaft 20. The semi-circular bearing bushing 36 is further provided with two serrated beveled edges as shown in 38 and 39 which converge toward the center thereof, and adapted to be engaged by the serrated edges 40 of the wedge members 32 and 33. The wedge members 32 and 33 are normally actuated toward each other by a spring 41 which has its opposite ends engaging the ears 42 formed on each of the wedge members. These serrated edges 40 on each of the wedge members 23 and 33 cooperating with the inclined serrated edge portions 38 of the semi-circular bearing bushing 36 in a manner to permit a slight retractable movement should the case arise due to the expansion of the bearing but does not, however, permit the semi-circular bearing to retract beyond a single tooth formed on these beveled surfaces.

From the above description it will be seen that as the wear develops on the semi-circular bearing surface and flange 37 of the semi-circular bearing 36 that the spring 41 will normally actuate and automatically actuate the wedge members 32 and 33 to move toward each other for taking up the radial and end wear or looseness as wear occurs on the bearing.

In the above specification I have described my improved automatic take up as being particularly adapted for a main bearing for a crank shaft, it will of course, be understood that the end thrust feature of this device may be eliminated and the invention may be applied to a piston rod connecting bearing in which radial wear only would be automatically compensated for.

While in the above specification I have described my improved combination automatic thrust and radial bearing take-up as being capable of taking up the end wear on the main bearings of a crank shaft for a Ford engine, it will, of course, be understood that the same is adaptable for main bearings of other types of engines in which compensation is essential for taking up the thrust and radial wear on the bearing. I, therefore, desire it to be understood that the invention is not limited to the particular use above described, inasmuch as other modifications than those illustrated and described may be made without departing from the spirit and scope of the invention as expressed in the following claims.

What I claim as my invention and desire to secure by Letters Patent is:

1. In combination with a crank shaft, a bearing support for said crank shaft, a bearing cap secured to said support, semi-circular bearing bushings mounted in said bearing support and cap, and means including a slidable wedge member mounted on said cap and engageable with one of said semi-circular bearing bushings for moving the same longitudinally with respect to said cap for taking up the radial and end wear on said bearing bushing.

2. In combination with a crank shaft, a bearing support for said crank shaft, a bearing cap secured to said support, semi-circular bearing bushings mounted in said bearing support and cap and means including a rotary wedge member mounted in said cap and engageable with one of said semi-circular bearing bushings for moving the same longitudinally with respect to said cap for taking up the radial and end wear on said bearing.

3. In combination with a crank shaft, a bearing support for said crank shaft, a bearing cap secured to said support, semi-circular bearing bushings mounted in said bearing support and cap and a spring actuated arcuately arranged wedge member mounted on said cap and having one edge thereof engageable with one of said semi-circular bearing bushings for moving the same with respect to said cap for taking up the radial and end wear on said bearing bushing.

4. In combination with a crank shaft, a bearing support for said crank shaft, a bearing cap secured to said support, and having an arcuate recess formed therein, said cap having a beveled edge on one side thereof, semi-circular bearing bushings mounted in said bearing support and cap and a wedge member mounted in the recess formed in said cap and having one edge thereof engaging the beveled edge on said cap and the other edge thereof engaging one of the semi-circular bearing bushings for moving the same with respect to said cap for taking up the radial and end wear on said bearing.

5. In combination with a crank shaft, a bearing support for said crank shaft, a bearing cap secured to said support having an arcuate recess formed therein, semi-circular bearing bushings mounted between said bearing support and cap, one of said bearing bushings having a semi-circular annular flange extending laterally therefrom and a wedge member mounted in the recess formed in said cap having one edge thereof engageable with the semi-circular flange formed on said semi-circular bushing for moving said semi-circular bushing with respect to said cap for taking up the radial and end wear on said bearing.

6. In combination with a crank shaft, a bearing support for said crank shaft, a bearing cap secured to said bearing support, said bearing cap having an arcuate recess formed therein with one of the walls of said recess being at an angle with respect to the longitudinal axis thereof, semi-circular bearing bushings mounted in said bearing support and cap, an arcuately actuated wedge member mounted in said recess and a spring connecting said wedge member with said cap whereby said wedge member is automatically actuated for moving one of said semi-circular bearing bushings with respect to said cap for taking up the radial and end wear on said bearing.

7. In combination with a crank shaft, a bearing support for said crank shaft, a bearing cap secured to said bearing support, there being a transversely angularly arranged recess formed in said cap, semi-circular bearing bushings mounted in said bearing support and cap, a semi-circular flange formed on one of said semi-circular bearing bushings, a wedge member mounted in the recess formed in said cap and an extension spring connecting said wedge member with said cap whereby said wedge member is automatically moved for actuating one of said semi-circular bearing bushings longitudinally with respect to said cap for taking up the radial and end wear on said bearing.

8. In combination with a crank shaft, a bearing support for said crank shaft, a bearing cap secured to said support, semi-circular bearing bushings mounted between said bearing support and cap and means for automatically moving one of said semi-circular bearing bushings radially and longitudinally with respect to said cap for taking up the radial and end thrust wear on said bearing.

9. In combination with a crank shaft, a bearing support for said crank shaft, a bearing cap secured to said support, semi-circular bearing bushings mounted between said bearing support and cap and single means for automatically moving one of said semi-circular bearing bushings radially and longitudinally with respect to said cap for compensating for the radial and end thrust wear on said bearing.

10. In combination with a crank shaft, a bearing support for said crank shaft, a bearing cap secured to said support, semi-circular bearing bushings mounted between said bearing support and cap and spring actuated means for moving one of said semi-circular bearing bushings in two directions for automatically taking up the radial and end thrust wear on said bearing as wear ensues.

11. A device for taking up the radial and end thrust wear on a bearing for a crank shaft comprising two semi-circular bearing bushings, a bearing cap associated with said semi-circular bearing bushings and means mounted on said cap and engageable with one of said semi-circular bearing bushings for moving the same radially and longitudinally for automatically taking up the radial and end thrust wear on said bearing as wear ensues.

12. A device for taking up the radial and end thrust wear on a bearing for a crank shaft comprising two semi-circular bearing bushings, a cap supporting said bearing bushings and spring actuated slidable means mounted on said cap and engageable with one of said semi-circular bearing bushings for automatically moving the same radially and longitudinally with respect to said cap for taking up the radial and end thrust wear on said bearing connection as wear ensues.

13. In combination with a crank shaft, a bearing support for said crank shaft, a bearing cap secured to said support, semi-circular bearing bushings mounted between said bearing support and cap, and single means mounted on said cap and engageable with one of said semi-circular bearings for moving said semi-circular bearing longitudinally and radially for compensating for radial and end thrust wear on said bearing.

In testimony whereof I have signed my name to this specification on this 10th day of November, A. D. 1927.

GUSTAV C. MONCKMEIER.